United States Patent [19]
Smith et al.

[11] 3,967,698
[45] July 6, 1976

[54] OILER FOR POWER CHAIN SAW

[75] Inventors: Richard Thomas Smith; Michael T. Lay, both of Columbia, Mo.

[73] Assignee: McGraw-Edison Company, Elgin, Ill.

[22] Filed: Mar. 20, 1975

[21] Appl. No.: 560,535

[52] U.S. Cl. .......................... 184/15 A; 184/27 R; 417/501; 30/382
[51] Int. Cl.² ............................................ F16N 714
[58] Field of Search ............. 184/15 R, 15 B, 27 R, 184/26, 15 A; 417/501, 279; 30/381–386, 123.4

[56] References Cited
UNITED STATES PATENTS

| | | | |
|---|---|---|---|
| 2,062,447 | 12/1936 | Davis | 417/501 X |
| 2,157,970 | 5/1939 | Rowland et al. | 417/501 X |
| 3,382,898 | 5/1968 | Walker | 30/382 |
| 3,763,962 | 10/1973 | Gottlieb | 184/15 R |
| 3,870,125 | 3/1975 | Gorski | 30/383 X |

*Primary Examiner*—Richard C. Pinkham
*Assistant Examiner*—William R. Browne
*Attorney, Agent, or Firm*—Charles F. Lind

[57] ABSTRACT

A power chain saw oiling device that automatically supplies lubricating oil to the cutting chain and guiding cutting bar. The device is easy and economical to fabricate and to assemble in the saw. An oil reservoir is formed in the saw housing and an oil flow path leads from the reservoir through a piston type pump to an oil distribution cavity open to the cutting bar and chain. The piston is operated directly by sliding contact against a cam rotated with the output shaft. A bypass tube of relatively narrow cross section is provided from the pump output chamber and discharges into the oil reservoir from its discharge end which is located above the distribution cavity to the cutting bar and chain. Oil flow from the pump is thus directed both to the oil distribution cavity for chain lubrication and to the bypass tube back to the oil reservoir. Under normal saw operation oil flow occurs to both, with sufficient discharge occurring to the chain for proper lubrication thereof; whereas the uphill pitch of the bypass tube creates a back pressure so that under low speed saw operation most, if not all, of the oil flow effectively goes to lubricate the chain and little or no oil is bypassed to the oil reservoir.

7 Claims, 7 Drawing Figures

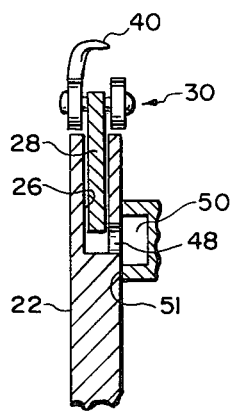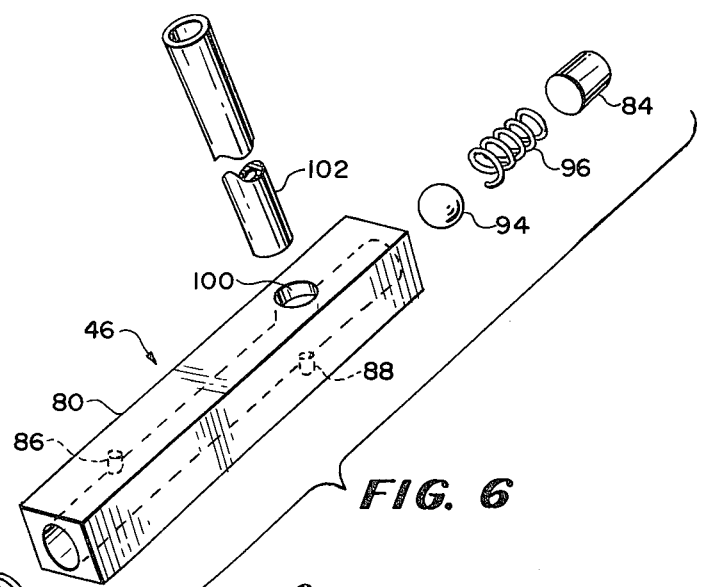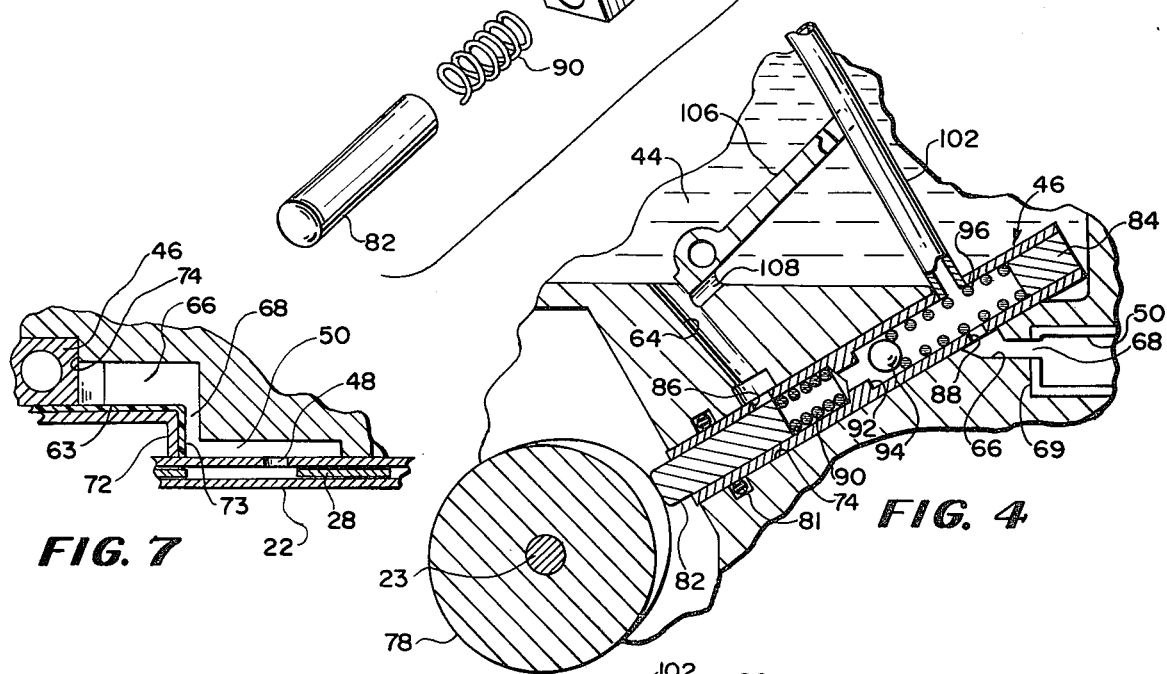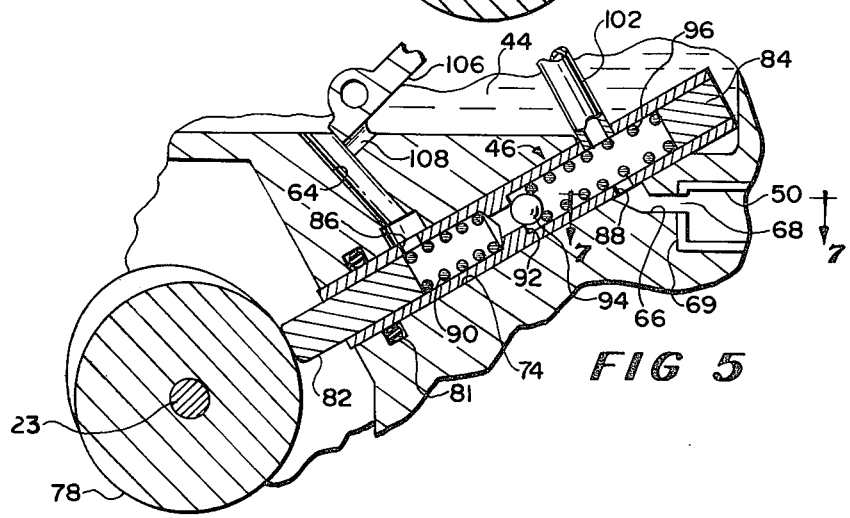

OILER FOR POWER CHAIN SAW

This invention relates to a power chain saw oiling device that supplies lubricating oil to the cutting chain and guiding cutting bar automatically and in varying quantities more commensurate with the varying high demand-low demand situations during use of the saw; particularly to such a device that is easy and economical to fabricate and assemble in the saw.

In a power chain saw, a guide or cutting bar typically supports a roller chain within peripheral grooves in the bar, and a rotated sprocket at one end of the bar and driven by a gasoline engine or electric motor rotates the roller chain at relatively high speeds about the cutting bar. Cutting elements or tips fabricated as link parts of the roller chain project outwardly away from the cutting bar, and a log stop on the housing adjacent the moving chain stops any advance of the rotating chain that would normally occur during the cutting movement of the tips past the log, as is well known in the art.

An important aspect of such a power saw is the life expectency of and the wear characteristics between the roller chain and the cutting bar. The expectency can be extended significantly by proper lubrication, and this typically means a liberal supply of oil brought to the wear areas between the bar and the moving saw chain. Various known oiling devices have been devised which operate either manually or automatically, and these might include the following:

The Carlton U.S. Pat. No. 3,180,378 teaches a cutting chain and particular cooperation between a drive sprocket and the chain.

The Arff et al. U.S. Pat. No. 3,777,401 teaches a channel for distributing lubricating oil to the cutting bar and chain.

The Johnson U.S. Pat. No. 2,741,275 illustrates manual pump means for delivering oil to the cutting bar and chain.

The Kiekhaefer U.S. Pat. No. 2,605,787 illustrates the use of internal combustion engine crank case pressure for forcing lubricating oil from a reservoir to the cutting bar and chain.

The Kiekhaefer U.S. Pat. No. 2,650,626 illustrates a pump powered by the saw drive motor that pumps oil to the cutting bar and chain.

The fluid output of the positive displacement pumps is proportional to the operating pump speed, so that the oil delivered at an idle no-load operating speed is typically more than the oil delivered when the saw is loaded during cutting and the saw slows down. The volume of oil pumped is decreased and less oil is delivered to the saw during this time when lubrication is most needed. If the pump capacity supplies sufficient oil to the saw chain during the loaded cutting phase of operation, then typically excess amounts of oil are delivered to the chain saw during the no-load operating conditions of the saw.

This invention teaches an oiling device that economically but reliably brings the oil to the cutting bar and chain for lubrication of the chain almost on demand according to the varying operating and/or demand conditions of the saw.

The advantages of this invention will be better understood and appreciated after reviewing the following specification, the accompanying drawings forming a part thereof, wherein:

FIG. 3 is a sectional view as seen generally from line 3-3 in FIG. 2, illustrating the chain saw and cutting bar guide means therefor, and the oil distribution means;

FIGS. 4 and 5 are detail sectional views of the oil pump and its operative cooperation in the saw housing;

FIG. 6 is a exploded perspective view of the oil pump used in the subject saw; and FIG. 7 is a sectional view as seen generally from line 7-7 in FIG. 5.

Figure 1:
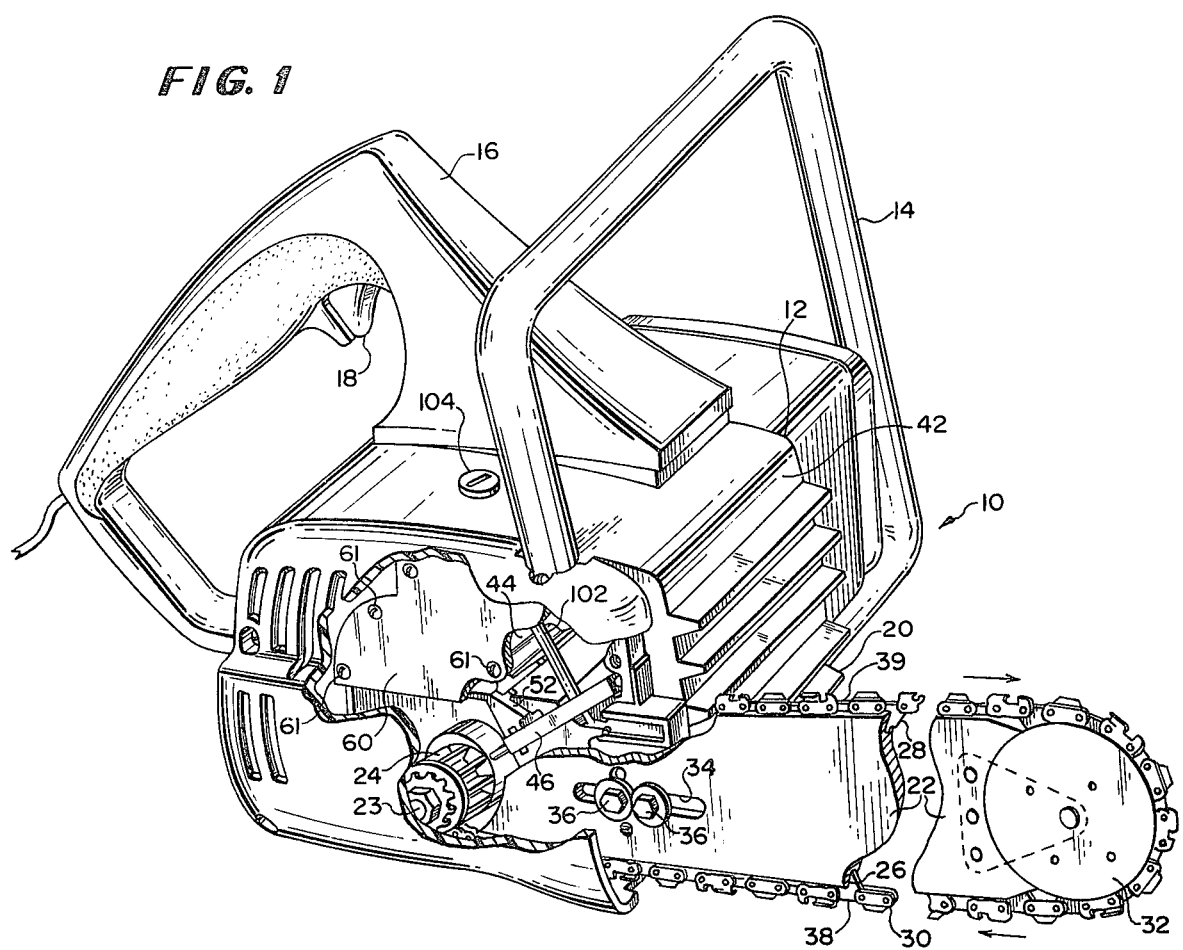
FIG. 1 is a perspective view of an electric power chain saw showing a preferred embodiment of the subject automatic oiler incorporated therein.

The saw 10 illustrated in FIG. 1 for example, has a main housing 12 with a guard handle 14 and a control handle 16 secured thereto, and a power on/off speed control 18 is incorporated in the control handle. The housing has a forwardly disposed log stop or bucking spike 20, and a cutting bar 22 is supported by the housing to project forwardly away from the log stop typically adjacent the right side edge thereof, for use of the saw with right hand gripping of the control handle and left hand gripping of the guard handle. An electric motor power unit (not shown) is enclosed within the housing 12 and the drive from the motor has an output shaft 23 to which drive sprocket 24 is keyed. The sprocket thus rotates generally about an axis disposed at right angles through the plane of the cutting bar 22 and is generally lined up with the cutting bar.

The cutting bar 22 has a peripheral groove 26 formed therein particularly exposed at the top and bottom edges thereof, where the opposed groove faces guide tabs 28 formed as alternate link parts of roller chain 30. The guide tabs 28 further cooperate with the toothed drive sprocket 24 to allow the chain to be driven by the sprocket. The forward part of the guide bar rotably supports grooved idler sprocket 32 and the roller chain 30 is thus trained around the drive sprocket 24 and the idler sprocket 32 and is maintained in proper registry within the guide grooves 26 of the cutting bar. The guide bar 22 has a slot 34 and securing bolts 36 attach through the slot to the housing 12 to allow for guide bar adjustment relative to the drive sprocket in order to maintain proper roller chain tightness.

The power saw normally is operated with the chain driven in a clockwise direction as seen in FIG. 1, where the bottom run 38 of the chain moves towards the log stop 20 and the top run 39 of the chain moves away from the log stop. The roller chain itself has cutting tabs or elements 40 which project away from the cutting bar on the remote side thereof. Typically only alternate links of the roller chain are provided with the cutting elements and the alternate cutting elements may be of right and left hand constructions. The particular chain construction and the spacing or configuration of the cutting elements or the drive tabs is the subject of many patents and other technical disclosures and forms no part of the subject invention.

The particular invention relates to the manner of bringing oil to lubricate the guide grooves 26 on the cutting bar and thus the guide tabs 28 to the roller chain. The oil is needed obviously, to allow for free sliding of the tabs 28 within the grooves 26 as well as free flexture of each of the connected links forming the roller chain.

It is to be noted that the housing 12 actually has a central casting 42, preferably of aluminum to be light in weight while yet being durable and capable of dissipating the heat of operation, and there is an oil reservoir 44 formed within this casting. There further is an oil path from the oil reservoir 44 through a pump 46 for distribution to the cutting bar and chain.

Figure 2:
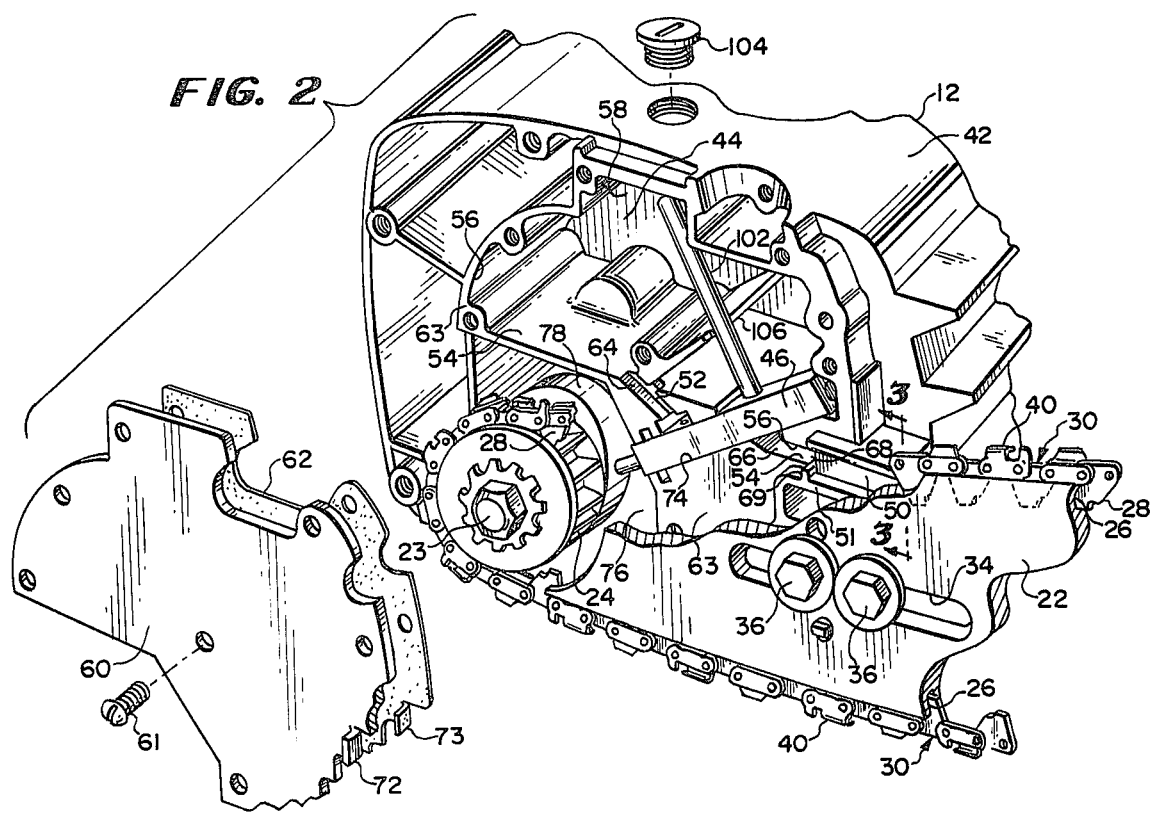
FIG. 2 is an enlarged view similar to FIG. 1, except being exploded with part of the exterior housing removed and further having an oil reservoir cavity closure plate separated from the housing.

Specifically, FIG. 3 shows that the inboard wall of the cutting bar has an opening 48 to the chain receiving channel or groove 26, and that this opening lines up with a relieved area or recess 50 formed in face 51 of the casting when the cutting bar is secured in place against this housing face. The reservoir 44 (FIGS. 1 and 2) is defined by casting recess 52, formed by appropriately interconnected peripheral walls 54 and 56 and interior wall 58, being closed by a plate 60 secured by bolts 61 to the casting in sealed contact against an interposed gasket 62, which gasket in turn is in sealed contact against the face 63 of the casting. Appropriate channels 64 and 66 are formed in the open face 63 of the casting between the oil reservoir and pump and from the pump toward distribution cavity 50 respectively, and the plate 60 and gasket 62 also enclose these recesses. A further recess 68 is formed in a casting face 69 extended at an angle between the other casting faces 51 and 63, and tab 72 on the plate 60 cooperates with a like tab 73 on the gasket to enclose this recess to interconnect the same between the oil path recess 66 and oil distribution recess 50 and define a fluid tight flow path from the pump to the distibution recess.

Typically the oil reservoir 44 is located in the upper part of the casting vertically above the drive sprocket 24 and shaft 23. The casting further has an open cavity 74 extended between the oil reservoir cavity and a central cavity 76 surrounding the drive sprocket. A cam element 78 is keyed to the drive shaft 23 and disposed inboardly adjacent the drive sprocket 24 within the cavity 76 and lined up with cavity 74.

The pump 46 has a body portion 80 received in the cavity 74 and packing or a gasket 81 is received in a groove on the casting in surrounding relation to the pump body and thus this plus the interposed plate gasket 62 normally precludes oil leakage beyond the pump body from the oil reservoir 44. The pump body 80 has a through bore formed therein, and a piston 82 that fits in one end of the through bore and the opposite end of the through bore is closed by a plug 84 pressed therein. There are spaced openings in the pump body to communicate with the interior bore: the pump inlet opening 86 lines up with the relieved channel 64 which communicates with the oil reservoir 44; and the pump outlet opening 88 lines up with the channel 66 which communicates through channel 68 with the oil distribution cavity 50.

The piston is normally biased by a coil compression spring 90 against the adjacent face of the cam member 78 so that cam rotation causes the piston to reciprocate within the pump bore. The end of the piston in the outward position (FIG. 5) is clear of the inlet bore 86 while in the inward pumping positions (one shown in FIG. 4) is past the inlet bore. A necked down outlet check seat 92 is formed in the bore of the pump body and a ball or check 94 is bias by a coil compression spring 96 against the seat, and thus serves to maintain the check against the outlet seat 92 in the normal non-pumping condition. Appropriate sealing rings or the like or merely close tolerance fit between the piston and the pump bore minimize leakage past the pump between the piston and pump bore outwardly toward the cam. However, even then the minimized leakage that can or does occur beyond the pump is effectively used since it serves to lubricate the pump piston against the rotating cam member and minimize the frictional drag between these components.

Under normal operating conditions, the oil is fed to the upper run 39 of the chain which travels away from the housing and this serves to lubricate the entire chain and guide including the lower run 38.

There is still a further opening 100 to the outlet bore of the pump and this tightly receives a bypass tube 102 of relatively narrow cross section. This bypass tube extends into the oil reservoir and terminates at its free or discharge end generally near the upper wall of the reservoir.

It is understood that the piston 82 in the oil pump bore is biased by coil compression spring 90 against the cam 78 so that cam rotation first drives the piston into the bore where the inboard end of the piston passes the oil inlet opening 86 and closes the same off and effectively pumps oil from the chamber past the outlet check 94 to the pump outlet chamber; whereas continued cam rotation allows the piston to reeced and uncover the inlet port and allow the inlet flow of oil from the reservoir to the pump bore. The oil leaving the outlet pump chamber travels through the respective channels to the oil distribution recess 50 at the cutting chain, and through the bypass tube 102 back to the reservoir.

Only a limited oil flow through the opening 48 to the saw chain is needed for complete lubrication, and because the back pressure of this leakage type oil feed is s low, the flow requirements are frequently satisfied merely by having oil at the oil distribution chamber 50. The pump capacity is designed to exceed this at normal speeds and to be at least equal to it at the lowest expected operating speed. Consequently, part of the oil under normal pumping conditions is bypassed out the bypass tube 102 back to the reservoir. The flow resistance of the bypass tube is minimal, but the uphill tube run creates a minimum head back pressure against flow which exceeds the lubricating leakage back pressure so that the low speed operation provides that most, if not all, of the oil flow effectively goes to the cutting bar and chain. On the other hand, when the saw, and thus the pump, is running at full speed, the increased pumping capacity exceeds the bypass tube back pressure to circulate the excess oil flow through the bypass tube back to the reservoir, and the lubrication flow to the cutting bar and moving chain remains almost constant or is increased only slightly.

It will be noted that the construction is quite economical: where in the first place, the pump 46 can be fabricated of relatively economical components including the pump body 80; the pump piston 82 and return spring 90; the ball check 94, return spring 96, and closure plug 84; and the bypass tube 102; and in the second place, the same is capable of being preassembled to define as it were the single pump unit. The pump unit 46 in return is physically fitted into its casting cavity 74 and mechanically held within limits therein by abutment against casting walls 74 and 76; and further the unit is sealed by the appropriate gasket or packing 81. The removable plate 60 and interposed gasket 62 mechanically hold the pump tightly in the casting cavity. The oil reservoir and flow paths are likewise formed within and by relieved areas or recesses in the casting which are all closed only by the plate and interposed gasket.

The reservoir is filled through an opening in the top wall of the reservoir, and is closed by a screw plug 104. A forwardly inclined wall 106 extends across the casting cavity 52 projected upwardly from the bottom peripheral wall 54 but does not reach the peripheral wall 56 and this defines a pocket to hold part of the oil upon any sudden shifts of saw orientation to where the cutting bar is extended vertically above the housing. A notch 108 located at the corner of the wall communicates with channel 64 to allow for oil flow from the pocket to the pump inlet, as well as for equalizing the oil levels when the saw is oriented horizontally, such as when not in use and merely supported on a flat horizontal surface. When the saw is oriented with the cutting bar inclined downwardly, the wall 106 also temporarily traps part of the oil in the inlet side of the reservoir, and thus tends to provide for continuous lubrication regardless of the saw orientation normally encountered during use.

What is claimed is:

1. In a power chain saw having a cutting bar and a drive sprocket supported to rotate at varying speeds in line with the cutting bar, a cutting chain trained over the cutting bar and sprocket and guide means cooperating between the cutting bar and chain supporting the latter for rotation around the former, and oil distribution means to the cutting bar and chain guide means for lubrication of the same where the back pressure to the lubrication flow is minimal, the improvement comprising the combination therewith of a pump having an expansible pump chamber and having an oil inlet to and an oil outlet from the chamber, means defining an oil reservoir and an oil flow path that is uninterrupted between the reservoir and the pump inlet and between the pump outlet and the oil distribution means, means driving the pump at a speed related to the speed of the drive sprocket, the pump having oil pumping capacity at the lowest expected drive sprocket speed at least equal to a minimum lubrication flow and having oil pumping capacity well in excess of this minimum lubrication flow at full drive sprocket speed, and bypass flow means extending uninterruptedly from the pump outlet to the reservoir for bypassing the excess pumping capacity, and offering minimal resistance to oil flow therethrough and having its oil discharge point to the reservoir at such an elevation above the oil distribution means to develop a head back pressure against flow of the bypassing oil which of a magnitude minimally greater than the back pressure of the minimum lubrication flow, operable to bypass little, if any oil at the lowest expected drive sprocket speed, but to bypass progressively more oil directly into the reservoir automatically at faster speeds toward the full drive sprocket speed.

2. A power chain saw combination according to claim 1, wherein the saw has a housing casting having interconnected walls defining an open sided cavity terminating along one face, a plate disposed against the one housing face and defining thereby the oil reservoir, wherein the oil flow path is defined in part as a groove in said one housing face closed also by said plate, wherein the oil distribution means is spaced laterally from and lies in a different plane from the one housing face, wherein the oil flow path is further defined in part as a second groove in a second face of the housing which face is disposed at an angle transverse to the one housing face, and wherein said plate has a tab thereon to cooperate with the second face for enclosing the groove therein.

3. power chain saw combination according to claim 1, wherein the pump includes a separate body element defining therein the expansible pump chamber, wherein the pump body also includes an opening to the pump chamber near the outlet therefrom, and wherein the bypass flow means is in the form of a tube snuggly fitted into the opening to be supported by the pump body.

4. A power chain saw combination according to claim 3, wherein the pump body element has a through bore therein, a piston disposed in the through bore and projecting from one end thereof, a plug secured to the body element and closing the other end of the through bore and defining thereby the expansible pump chamber, an outlet seat open to the other end of the through bore, a check element for closing the seat, a spring for maintaining the check against the outlet seat except when the same is forced off the seat during pump discharge, and the plug serving also to hold the spring in place in the pump body.

5. A power chain saw combination according to claim 1, wherein the pump includes a separate body element defining therein the expansible pump chamber, wherein the saw has a housing casting having interconnected walls terminating along one face and defining an open side cavity, a plate disposed against the one housing face and defining thereby the oil reservoir, wherein the housing casting also has an open sided recess in the one housing face, and wherein the pump body fits within the casting recess and is constrained therein by the plate.

6. A power chain saw combination according to claim 5, wherein the pump body also has an opening to the pump chamber near the outlet therefrom, and wherein the bypass flow means is in the form of a tube snuggly fitted at one end into the opening to be supported by the pump body with the opposite end of the tube terminating near the uppermost casting wall of the oil reservoir.

7. A power chain saw combination according to claim 5, wherein the oil distribution means is spaced laterally from and lies in a different plane from the one housing face, said housing having a second face, wherein the oil flow path is defined in part as a groove in the second face of the housing which face is disposed at an angle transverse to the one housing face, and wherein said plate has a tab thereon to cooperate with the second face for enclosing the groove therein.

* * * * *